United States Patent Office 3,200,790
Patented Aug. 17, 1965

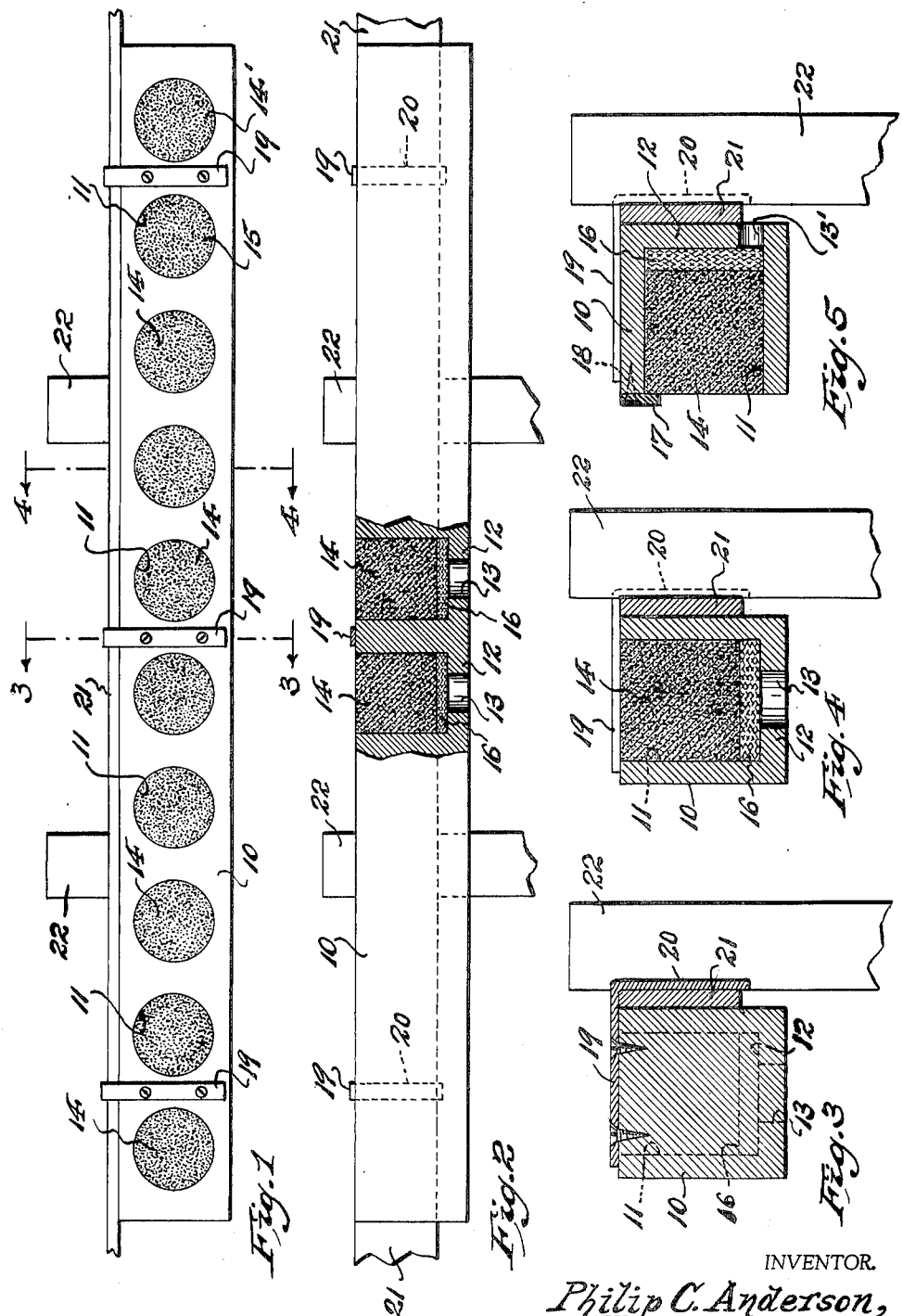

3,200,790
ANIMAL FEEDING DEVICE
Philip C. Anderson, Crete, Nebr., assignor to Feed Service Corporation, Crete, Nebr., a corporation of Nebraska
Filed Sept. 18, 1963, Ser. No. 309,651
2 Claims. (Cl. 119—51)

In my co-pending patent application Ser. No. 299,163, filed August 1, 1963, I have disclosed edible compositions which will satisfy some of the nutritional requirements of animals supplementary to their normal forage, grain or like diet; an assortment of such supplementary compositions being provided subject to selective ingestion by a feeding animal according to exercise of its taste sensory system; said supplementary compositions being provided in initially solid form and so presented that, when licked by the animal, the selected composition will be easily eroded by the animal's tongue, and will yield a selected, trace element in form soluble in the animal's saliva.

The present invention relates to a feeding device operative to present, to partaking animals, an assortment of supplementary edible compositions, subject to selection by the feeding animal in exercise of its taste sensory system.

The present invention has for an object to provide a feeding device for the above mentioned purposes, comprising a body member having a plurality of outwardly open wells or sockets, suitably spaced apart, and adapted to contain and support an assortment of supplementary nutrient blocks of soluble composition, and to present the same in position to be readily accessible to a feeding animal subject to licking and ingestion thereby.

The above and other objects of the present invention will be understood from a reading of the following description of an illustrative embodiment thereof as shown in the accompanying drawings, in which drawings:

FIG. 1 is a top plan view of one illustrative embodiment of a feeding device according to this invention, and as operatively mounted on a suitable supporting means;

FIG. 2 is a front elevational view of the same, in part section;

FIG. 3 is a vertical cross-sectional view of the feeding device, taken on line 3—3 in FIG. 1, but drawn on an enlarged scale;

FIG. 4 is another vertical cross-sectional view, taken on line 4—4, and also drawn on an enlarged scale; and FIG. 5 is a vertical cross-sectional view, similar to that of FIG. 4, but showing a modified form of the feeding device.

Like characters of reference are applied in the above described views of the drawings to indicate corresponding parts.

Referring to FIGS. 1 to 4 inclusive of the drawings, the illustrative embodiment of a feeding device, according to this invention, as therein shown comprises an elongated body member 10 of suitable length and of suitable height and width, being preferably rectangular in cross-section. Although said body member may be produced from any suitable material, it is preferably made of wood.

The body member 10 is provided with a plurality of wells or sockets 11, which are suitably horizontally spaced apart along the length thereof, so as to be outwardly open from its top surface. These wells or sockets 11 are of a size and shape such as to correspond to the size and shapes of the assortment of blocks of different compositions desired to be supported and presented thereby for selective choice by a feeding animal, and of such depth as to provide bottom walls 12 at the underside of the body member. Said bottom walls are provided with drain openings 13.

The number of wells or sockets 11 provided in the body member 10 may vary, and in general will correspond in number to the number of blocks of nutrient compositions or other substances desired to be presented, as a set, to feeding animals. By way of illustration, assume that a set of eight blocks 14 of nutrient compositions are desired to be presented, each containing a different trace element of a selected nutrient composition. For example, as disclosed in my aforesaid co-pending patent application Ser. No. 299,163, an assortment of nutrient blocks 14 may comprise those selected from the group consisting of compositions respectively containing iron, cobalt, nickel, manganese, copper, zinc, calcium and magnesium. In this case the body member 10 will be provided with eight wells or sockets 11 to contain and present such respective nutrient composition blocks 14. An additional well or socket 11 is provided, if desired, to contain and present a control block 15, such for example as a composition comprising citric acid and a waxy binder; which composition a feeding animal does not consume. Also, if desired, one or more added wells or socket 11 may be provided to contain and present a nutrient block 14' which is a duplicate of any selected trace element known to be heavily consumed.

At least the blocks 14 and 14' of the nutrient compositions are provided at their bottom or inner ends with a layer of wax 16, adapted to be interposed between the nutrient compositions thereof and the bottom walls of the wells or sockets 11 in which said blocks are lodged. These wax layers 16 allow the nutrient compositions of the blocks to be consumed without the last fragments thereof being eaten whole or at one time, since said last fragments are bound by the wax so as to be held only in lickable condition and so consumed by the licking animal as dissolved in the animal's saliva. The feeding animal will refuse to eat the wax by itself.

The drain openings 13 will discharge from the wells or sockets 11 any water, saliva or other liquid which seeps between the walls of the well or sockets and their contained nutrient or other blocks to the well or socket bottoms, thereby preventing accumulation of such liquids in the well or socket bottoms, and thus avoiding consequent deleterious effects, including risk of the blocks being floated out of the wells or sockets.

In the embodiment of this invention as shown in FIGS. 1 to 4 inclusive, the wells or sockets 11 open from the top surface of the body member 10, which is generally a desirable arrangement. However, as shown in FIG. 5, if desired, the body member 10 may be supported on its side, so that the wells or sockets 11 present a forwardly-presented face thereof instead of the top face. In this disposition, not only can a feeding animal lick the nutrient blocks from a forward face of the body member, but the wells or sockets 11 tend to remain much cleaner in use. In this case, the bottoms of the wells or sockets 11 are also provided with drain openings 13', and, in order to prevent outward displacement of the contained blocks from the wells or sockets, a keeper means 17 of suitable form, but preferably in the form of a strip of wood, is detachably affixed, as by screws 18 or other suitable fastening means, to the body member 10 so as to lap the outer open ends of the wells or sockets and their contained blocks.

The body member 10, in either disposition thereof, is provided with a plurality of suitably disposed hanger members 19 having offset rearwardly projecting hook portions 20 adapted to engage any suitable support, such e.g., as a horizontal fence or other rail 21 mounted on posts 22. In any case, the operative supported disposition of the body member 10 should be such as to present the wells and sockets 11 and their contained blocks at a level opposed to an animal's head, when the animal is feeding.

Having now described my present invention, what is claimed is:

1. An animal feeding device of the kind and for the purpose described, comprising an elongated body member provided with a plurality of wells horizontally spaced apart by intermediate portions of said body member, each of said wells being of a given size and having therein a block of a corresponding size for licking and ingestion by a feeding animal, at least one of the wells having such a block comprising a control substance and the remainder of said wells having such blocks comprising respective selected nutrient compositions, each of said wells being adapted to permit separate removal of a block therefrom and having a bottom wall provided with drain means, and hanger means affixed to said body member operative to mount the latter on suitable supporting means so that said wells are accessible to a feeding animal.

2. An animal feeding device according to claim 1, wherein the body member is provided with at least one additional well having a block of nutrient composition which is a duplicate of one of said first mentioned group of nutrient composition blocks.

References Cited by the Examiner

UNITED STATES PATENTS

| | | | |
|---|---|---|---|
| D. 27,019 | 5/97 | Leonard. | |
| 1,737,797 | 12/29 | Jacot | 119—61 |
| 2,235,959 | 3/41 | Copeman | 119—51 |
| 2,306,312 | 12/42 | Hyde | 119—51 |
| 2,571,275 | 10/51 | Meaker | 119—51 |

FOREIGN PATENTS 283,334  9/52  Switzerland.

SAMUEL KOREN, *Primary Examiner.*

HUGH R. CHAMBLEE, *Examiner.*